Figure 1:
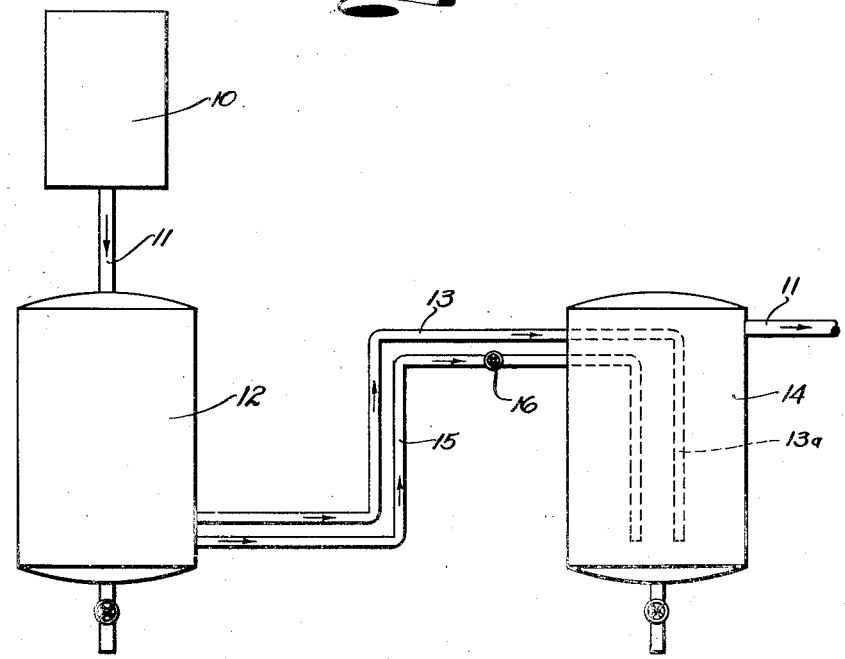

Foster M. Stephens
INVENTOR.

Patented July 30, 1946

2,405,100

UNITED STATES PATENT OFFICE 2,405,100

PULSATION ELIMINATION IN GAS LINES

Foster M. Stephens, Los Angeles, Calif., assignor to The Fluor Corporation, Ltd., Los Angeles, Calif., a corporation of California Application January 11, 1944, Serial No. 517,857

12 Claims. (Cl. 230—236)

This invention relates generally to the dampening or elimination of pressure pulsations in the compressible fluid, and is concerned particularly with the problem of effectively eliminating the pressure pulsations created in gas lines connecting with piston-type mechanisms, especially gas compressors, because of the effects of the intermittent gas displacements by the pistons.

It is a matter of common experience in the operation and maintenance of, for example, natural gas compressor plants and the connecting gas pipe lines, that pulsations created in the lines by the compressor operations frequently assume such magnitude as to set up vibratory movements of the pipe excessive to the extent of endangering the necessary strength of the pipes and joints, and rendering it most difficult to anchor and properly maintain the lines in place. Insofar as I am aware, no satisfactory solution heretofore has been available, of the problem of obviating such conditions whatever may be such factors as the gas pressure, compressor displacement, and the frequencies of the vibrations or pressure pulsations.

It has been proposed, and attempted with varying degrees of success, to dampen out pulsations in the gas stream, by installing a single relatively large chamber in the offending line, with the idea of providing a zone of sufficient volume for dissipation of the pressure impulses. Under ideal conditions, this proposal has served the purpose, but most generally it has been found to be unsuitable for various reasons, among which is the necessity of using a chamber of such large size as to be impracticable.

The invention affords a simple, effective and thoroughly practical solution, and is characterized by the fact that it is capable of being pre-designed to meet any of various conditions that may exist in different situations giving rise to the necessity for pulsation elimination. Generally speaking, the present system involves the use of a pair of chambers in the nature of acoustical capacitances adapted to be connected into the pipe line, and of sufficiently small size as to obviate the above mentioned limitations of single chamber installations. This pair of chambers is interconnected by one or more relatively restricted passages serving in the nature of an acoustical inductance, all in a manner such that the gas stream flows from the line into one chamber, then through said passage and into the other chamber.

Since the line pulsations may occur at either or both the gas intake or discharge sides of the compressor, it will be understood that the present apparatus may be installed in the gas lines at either or both of such locations. Also the installation may be at any desired proximity to the compressor, though usually somewhat close thereto in order to eliminate as much line vibration as possible.

The existence of pulsations in the gas line leading to or from the compressor frequently reduces to a considerable degree the operating efficiency of the compressor. Where it is attempted to meter the gas flow through the lines, pulsations in the gas stream may render the metering inaccurate, or impractical in instances where the magnitude of the pulsations is great. The present system obviates these difficulties by assuming smooth flow promotive of high volumetric compressor efficiency and of a steady gas flow susceptible of accurate metering.

Figure 2:
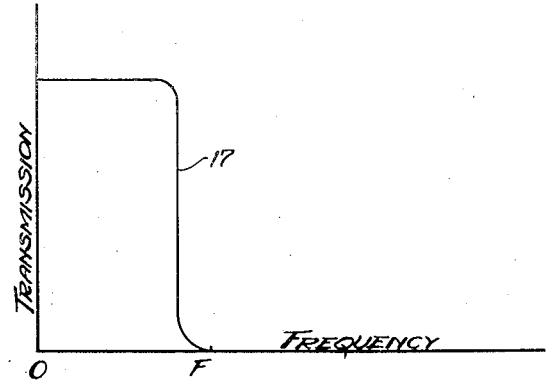

Most efficient operation of the apparatus requires maintenance of certain size relationships between the pair of chambers and the interconnecting passage. The method of determining such relationships may be explained to best advantage during the course of the following and further detailed description of the invention, and by reference to the accompanying drawing, in which:

Fig. 1 is a diagrammatic view of the pulsation eliminating system and connected compressor; and Fig. 2 is a graph illustrative of the transmission and frequency absorption characteristics of the system.

The gas compressor, diagrammatically indicated at 10, may in practice be one or more of any of the usual piston-type compressors employed in gas compressor plants. Such compressors may be single or multi-cylinder and may be single-acting or double-acting. A given compressor will operate to produce pulsations in a connecting gas line at what may be referred to as the fundamental frequency of the compressor. In the case of a single-acting compressor, this fundamental frequency will correspond to the compressor R. P. M., and in the case of a double-acting compressor, the fundamental frequency will of course be twice the compressor R. P. M. The gas is discharged by the compressor through line 11 containing the chambers and interconnecting passage, as will appear. It will be understood that where pulsations are to be eliminated at the intake side of the compressor, line 11 may be regarded as the inlet pipe carrying gas flowing through the chambers to the compressor.

Under the assumed conditions, gas having pulsating flow is discharged through line 11 into an enlarged zone or chamber 12 from which the gas flows through pipe 13 into a second chamber 14, which preferably has substantially the same volume as chamber 12. Leaving chamber 14, the gas passes into the continuance of the main line 11 in a condition of substantially uniform or non-pulsating flow. Preferably the pipe connections with chambers 12 and 14 are arranged to prevent straight-line flow of the gas through the chambers. Typically, lines 11 and 13 may have 90° connections with chamber 12, as illustrated, and the outlet end 13a of pipe 13 may be extended down into the chamber 14 so that the gas reverses its flow in passing to the line 11.

At this point it may be observed that the lengths of all L's used in the chamber interconnecting pipe 13 are added in making the hereinafter explained calculations, as equivalent lengths of straight pipe. The overall length of the pipe 13 is measured between the actual ends of the pipe even though one or both ends of the pipe may extend within one or both of the chambers 12 or 14, as the case may be. The net volume of the chamber (the value of "V" in the equation below) is determined by subtracting the volume of the pipe when extended within the chamber, from the volume otherwise of the chamber.

As observed above, best results are obtained by evaluating or predetermining the volumes of the chambers 12 and 14, and the dimensions of the interconnecting passage in pipe 13, with relation to particular conditions for which the installation is to be made. The basis for these determinations is the following equation:

$$\frac{L}{R^2} \times V = \frac{C^2}{78.674 F^2}$$

wherein

L = the length in inches of the passage in pipe 13.
R = radius in inches of that passage.
V = the volume in cubic inches of one of the equal volume chambers 12 or 14.
C = net velocity, as defined below, in feet per minute of sound in the gas and of the gas stream in pipe 13.
F = fundamental frequency per second of pulsations created in the gas line 11 by the compressor and at the compressor outlet.

Relative to determination of the value of "C," if the apparatus is installed at the discharge side of the compressor, the value of "C" is the velocity of the gas in line 13 plus the velocity of sound in that gas. On the other hand, if the apparatus is installed at the suction or intake side of the compressor, the value of "C" becomes the velocity of sound in the gas in line 13, minus the velocity of the gas flow in that line. Accordingly, the expression "net velocity" is understood to mean the velocity of sound in the gas, plus or minus the velocity of the gas in the line 13, depending upon whether the apparatus is installed respectively at the discharge or suction sides of the compressor. Inasmuch as the velocity of the gas is very low as compared with the velocity of sound in the gas, it is apparent that the velocity condition of importance is the velocity of sound in the gas. To cite an example of conditions encountered in practice where fairly high pressure gas is flowing through an eight inch line pipe, the velocity of sound in the gas may be in order of 100,000 feet per minute, or above, and the gas velocity around 300 to 400 feet per minute. Accordingly, the value of "C," whether or not the gas velocity is taken into account, represents substantially the velocity of sound in the gas.

When a reciprocating compressor is a source of pulsation, it is possible to determine the fundamental frequency (F) of the pulsations in accordance with the R. P. M. of the compressor, as previously explained. All harmonics of this frequency naturally will be at a higher frequency than this fundamental. Referring to Fig. 2 wherein pulsation transmission is plotted against frequency of the pulsations, the fundamental frequency may be assumed to have the magnitude indicated at "F." For purposes of calculation and design, it is only necessary to locate the cut-off frequency of the apparatus to the left of this fundamental compressor frequency, and then the fundamental, as well as its harmonics, will not be transmitted down-stream in the line 11.

Generally speaking, the value for "F" may be taken within the range of about 85% to 100%, or more strictly speaking, just less than the compressor fundamental frequency. Where the compressor is operable at variable frequencies, or speeds, the value for "F" preferably is selected to be just less than the lowest frequency. Satisfactory results have been obtained at a value for "F" corresponding to about 90% of the compressor fundamental frequency, at which the transmission-frequency curve is substantially as shown in Fig. 2. It is to be noted that at the cut-off point, i. e. 90% of "F," the curve 17 may have an abrupt or steep drop indicative of the effectiveness of the higher frequency elimination.

Having determined the value for "F," it then remains necessary to evaluate the physical dimensions of the chambers 12 and 14, and the interconnecting pipe 13. The left-hand side of the equation, i. e.

$$\frac{L}{R^2} \times V$$

defines the volume of each chamber and the length and inside radius of the connecting pipe 13. Accordingly it is only necessary to determine the value for "C" in order to have an arithmetic value for the entire right-hand side of the equation. The value of the velocity of sound in the gas being compressed is first approximated from existing tables under standard conditions, and is then corrected for pressure and temperature considerations to meet those conditions actually existing at the location in the line 11 where the pulsation is to be arrested.

While the factor "78.674" represents substantially the value to be used, it is stated in a specific valuation to a particular unit and three decimal places, simply because its theoretical derivation gives that specific value.

A value for $$\frac{L}{R^2}$$

is arbitrarily taken to be as large as can be tolerated with regard to pressure loss in the line 13. In other words, knowing the gas pressure at chamber 12 and the rate of gas flow to occur through line 13, the latter may arbitrarily be given length and radial dimensions permitting passage of the gas through the line within a suitable or limiting range of pressure drop. Having thus determined the values for "C" and $$\frac{L}{R^2}$$

the value of each chamber volume, or "V," becomes directly determinable. It will be understood of course that the determined value for "V" is substantially a minimum value, and that the chamber volume may be increased beyond that value without impairing performance, although in practice it is ordinarily desirable to make the chamber of a size close to its calculated volume in order to economize on materials and avoid unnecessarily large equipment. With the volume of the chambers and the length and radius of the interconnecting line thus established, it is only necessary to interconnect the parts in a manner most feasible for the particular installation. Experience with different installations indicates that in those instances it has been possible to keep the length of the connecting pipe 13 well under one-fourth the wave length of sound in the gas.

It may happen that in a given installation, the fundamental frequency of the compressor may be subject to variation, as where the compressor is convertible for operation either as a single-acting or double-acting type. In such situations, it may be desirable to render the apparatus capable of effectively eliminating pulsations despite such variation of the fundamental compressor frequency. Assuming, for example, the apparatus to be designed for use in conjunction with a single-acting compressor, conversion of the compressor operation to double-acting would of course result in an increased and excessive pressure drop in a single interconnecting line 13. Normally the capacities of the chambers 12 and 14 would be adequate for effective pulsation dampening at the increased rate of gas flow and at the changed fundamental compressor frequency, but a limitation would exist by reason of the restricted flow through a single line 13. It is apparent from the equation given above that when the frequency is doubled upon change from single-acting to double-acting compressor operation, and with the volumes of chambers 12 and 14 remaining the same, the value of $$\frac{L}{R^2}$$

can be greatly reduced and proper pulsation elimination still obtained. Accordingly, to render the apparatus adaptable to pulsation elimination under the changed condition, chambers 12 and 14 may be interconnected by one or more additional pipes 15 containing a valve 16 which is closed under the first described conditions of operation. When additional flow capacity then is needed under the last assumed conditions of operation, valve 16 may be opened to permit gas flow through line 15 and thereby add its flow capacity to that of line 13.

I claim:

1. In combination with a gas compressor, apparatus for dampening pulsations in a gas stream having pulsating flow created by the compressor, comprising a pair of relatively large pulsation absorbing chambers having corresponding minimum volumes as defined in the equation below and connected in series with the compressor, and a circular cross-section conduit forming an acoustical inductance passage interconnecting said chambers, the volumes of said chambers and the dimensions of said passage having predetermined values substantially in accordance with the following equation:

$$\frac{L}{R^2} \times V = \frac{C^2}{\text{substantially } 78.674 F^2}$$

wherein
L=length of said passage in inches,
R=radius of said passage in inches,
V=minimum volume of each chamber in cubic inches,
C=substantially the velocity in feet per minute of sound in the gas,
F=a selected value for the fundamental frequency per second of pulsations created in said gas stream by the compressor.

2. Apparatus as claimed in claim 1, in which "F" has a value within the range of 85% to 100% of said fundamental frequency.

3. In combination with a gas compressor, apparatus for dampening pulsations in a gas stream having pulsating flow created by the compressor, comprising a pair of relatively large pulsation absorbing chambers connected in series with the compressor, and means forming variable size relatively restricted acoustical inductance passage means interconnecting said chambers.

4. In combination with a gas compressor, apparatus for dampening pulsations in a gas stream having pulsating flow created by the compressor, comprising a pair of relatively large pulsation absorbing chambers connected in series with the compressor, a plurality of conduits interconnecting said chambers and forming relatively restricted acoustical inductance passages, and means for selectively maintaining gas flow through one or more of said conduits.

5. In combination with a gas compressor, apparatus for dampening pulsations in a gas stream having pulsating flow created by the compressor, comprising a pair of relatively large pulsation absorbing chambers connected in series with the compressor, a pair of conduits interconnecting said chambers and forming relatively restricted acoustical inductance passages, and valve means in at least one of said conduits.

6. In combination with a gas compressor, apparatus for dampening pulsations in a gas stream having pulsating flow created by the compressor, comprising a pair of relatively large pulsation absorbing chambers connected in series with the compressor so that the gas flows through both chambers continuously and at a substantially constant rate, and means forming relatively restricted acoustical inductance gas passage means interconnecting said chambers.

7. In combination with a gas compressor, apparatus for dampening pulsations in a gas stream having pulsating flow created by the compressor, comprising a pair of relatively large, substantially equal volume pulsation absorbing chambers connected in series with the compressor so that the gas flows through both chambers continuously and at a substantially constant rate, and means forming relatively restricted acoustical inductance gas passage means interconnecting said chambers.

8. In combination with a gas compressor, apparatus for dampening pulsations in a gas stream having pulsating flow created by the compressor, comprising a pair of relatively large pulsation absorbing chambers connected in series with the compressor so that the gas flows through both chambers continuously and at a substantially constant rate, means forming relatively restricted acoustical inductance gas passage means interconnecting said chamber, and a valve in said gas passage means, the volumes of said chambers and the dimensions of said inductance passage means being such as to cause substantial elimination in the gas flowing therethrough of pressure pulsations at the fundamental frequency created by the compressor.

9. In combination with a gas compressor, apparatus for dampening pulsations in a gas stream having pulsating flow created by the compressor, comprising a pair of relatively large pulsation absorbing chambers connected in series with the compressor so that the gas flows through both chambers continuously and at a substantially constant rate, and means forming relatively restricted acoustical inductance gas passage means interconnecting said chambers, the volumes of said chambers and the dimensions of said inductance passage means being such as to cause substantial elimination in the gas flowing therethrough of pressure pulsations at the fundamental frequency created by the compressor and at the higher harmonics of that frequency.

10. The combination comprising a piston-type compressor, a pipe line connecting with the compressor and within which pressure pulsations are created in a gas stream by the compressor operation, and a pair of relatively large pulsation absorbing chambers connected in series in said line so that the gas flows through both chambers continuously and at a substantially constant rate, and pipe means interconnecting said chambers and forming relatively restricted acoustical inductance gas passage means, the volumes of said chambers and the dimensions of said passage being predetermined to cause substantial elimination in said gas stream of pressure pulsations at the fundamental frequency created by the compressor and at the higher harmonics of that frequency.

11. The combination comprising a piston-type compressor, a pipe line connecting with the compressor and within which pressure pulsations are created in a gas stream by the compressor operation, a pair of relatively large pulsation absorbing chambers connected in series in said line so that the gas flows through both chambers continuously and at a substantially constant rate, and pipe means interconnecting said chambers and forming a relatively restricted acoustical inductance passage means, the volumes of said chambers and the dimensions of said passage being predetermined to cause substantial elimination in said gas stream of pressure pulsations in the frequency range of from about 85% to 100% of the fundamental frequency created by the compressor.

12. In combination with a gas compressor, apparatus for dampening pulsations in a gas stream having pulsating flow created by the compressor, comprising a pair of relatively large pulsation absorbing chambers connected in series with the compressor so that the gas flows through both chambers continuously and at a substantially constant rate, and means forming relatively restricted acoustical inductance gas passage means interconnecting said chambers, the volumes of said chambers and the dimensions of said inductance passage means being such as to cause substantial elimination in the gas flowing therethrough of pressure pulsations in the frequency range of from about 85% to 100% of the fundamental frequency created by the compressor and also at the higher harmonics at that frequency.

FOSTER M. STEPHENS.